Feb. 1, 1938.  R. S. BRESCKA ET AL  2,106,790
METHOD AND DEVICE FOR MEASURING
Filed Sept. 19, 1935
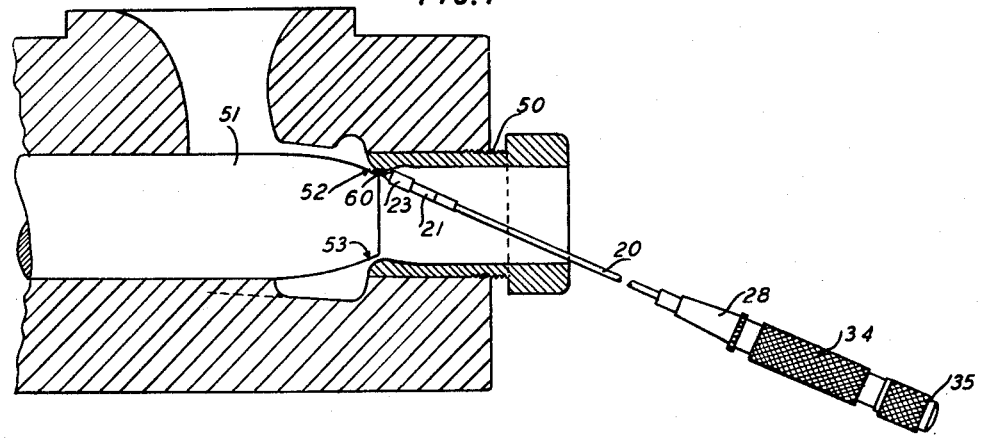
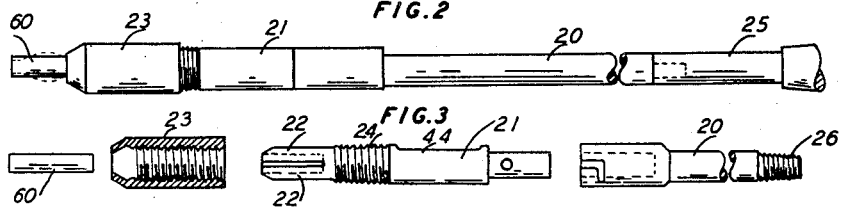
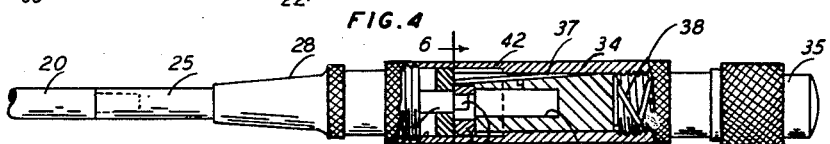
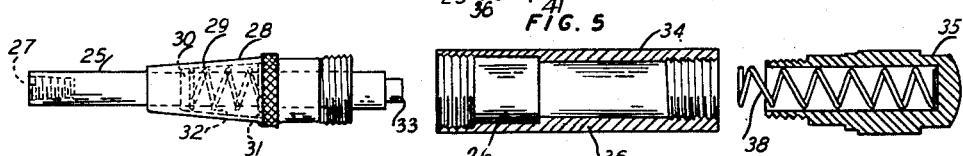
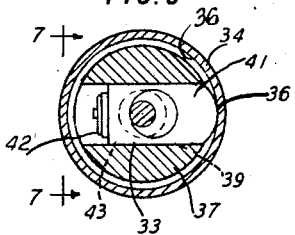
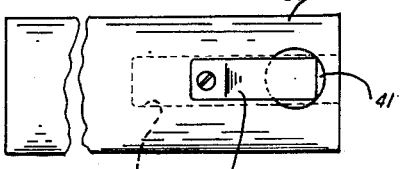
INVENTORS
R.S. BRESCKA
E.J. MEAGHER
BY
E.R. Nowlan
ATTORNEY Patented Feb. 1, 1938

2,106,790

UNITED STATES PATENT OFFICE 2,106,790

METHOD AND DEVICE FOR MEASURING

Rudolph S. Brescka, Cranford, and Edward J. Meagher, Newark, N. J., assignors to Western Electric Company, Incorporated, New York, N. Y., a corporation of New York Application September 19, 1935, Serial No. 41,200

6 Claims. (Cl. 33—125)

This invention relates to a method and device for measuring and more particularly to a method and device for accurately making measurements in a relatively inaccessible location.

In the manufacture of lead sheathed communications cable by forming the sheath over the core of the cable in an extrusion press, for example, the extruding head of the press may comprise a casing having a transverse passageway into which the bare core enters and from which the sheathed core emerges, and a coaxial guide in the passageway having an exit end formed as the frustum of a paraboloid. The thickness and circumferential uniformity of the extruded sheath are largely determined by the width and circumferential uniformity of the annular space between the paraboloidal nose of the guide member and the exit portion of the passageway. It may often be of considerable importance to measure accurately the width of this annular space at several points around its length to determine the eccentricity of position if any of the guide with respect to the body to enable this to be corrected. The principal difficulty in obtaining such measurements resides in the inaccessibility of the points between which the measurement is to be made, which can be reached only through the exit opening of the extrusion head.

An object of the present invention is to provide a simple, accurate and reliable device or gauge for making a measurement in such a relatively inaccessible location, and a method of gauging the relative position of difficultly accessible parts.

One embodiment of the invention contemplates a tool comprising a handle, a slender rigid shaft mounted to slide in the handle and having a chuck or the like at its outer end to removably hold a slug of impressionably plastic material such as lead and means in the handle to exert a hammering force through the shaft upon the slug, the handle and shaft serving as means to place the slug in the desired site, to swage it there, and to withdraw it again to be measured, as with a micrometer caliper.

Other objects and features of the invention will appear from the following detailed description of one embodiment thereof taken in connection with the accompanying drawing in which the same reference numerals are applied to identical parts in the several figures and in which Fig. 1 is a broken view in side elevation and partly in section of a tool constructed in accordance with the invention as applied in making measurements within a cable sheathing press;

Fig. 2 is an enlarged broken view in elevation of the shaft and chuck with a slug in the chuck;

Fig. 3 is an exploded view thereof, partly in section;

Fig. 4 is a broken view in elevation and partly in section of the handle and shaft;

Fig. 5 is an exploded view thereof with the hammer removed;

Fig. 6 is an enlarged section on the line 6—6 of Fig. 4, and

Fig. 7 is an enlarged broken, detached side view of the hammer alone taken in the direction indicated at 7—7 in Fig. 6.

In the embodiment of the invention disclosed a tool for making measurements, at any desired point, of the annular space between the body and the core guide of a cable sheathing press, is shown, which comprises a handle containing operating mechanism, a shaft and a chuck. The shaft has a slender rigid rod 20 as its principal part. A chuck body 21 is interchangeably mounted on the outer end of the rod by any convenient method such as the bayonet joint illustrated in Fig. 3. On the outer end of the body is a plurality of integral spring jaws 22, which may be forced together by a sleeve 23 interiorly threaded to match a male thread 24 on the chuck body.

The inner end of the rod 20 is reduced and threaded as at 26 to be coupled into an extension 25 provided at its outer end with a corresponding threaded recess 27. A sleeve 28 is slidably mounted on the extension and a helical compression spring 29 located in an appropriate recess 32 within the sleeve and surrounding the extension bears at its outer end against an annular stop 30 formed on the extension, and at its other end against another annular stop face 31 at the inner end of the recess in the sleeve, the tension of the spring tending to urge the extension outwardly relatively to the sleeve. The outer face of the stop 30 coacts with the outer end wall of the recess 32 to retain the extension within the sleeve. The inner end of the extension extends beyond the inner end of the sleeve and is formed with a short reduced coaxial stub 33.

The main body member 34 of the handle is a hollow cylinder, internally threaded at the outer end to be rigidly mounted thereby on the correspondingly threaded inner end of the sleeve 28, and internally threaded at its inner end to adjustably receive the correspondingly threaded inner end of a combination adjustment and retaining cap 35, the handle body and the cap being preferably externally roughened, as by knurling, to afford a good grip. The inner wall of the handle is generally cylindrical with a circumferential recess 36 in the forward part thereof.

A generally cylindrical hammer block 37 is slidable within the handle, and a helical compression spring 38 bears at one end against the inner face of the hammer 37 and at its other end against the end wall of the cap 35, the spring being adjustable as to tension by screwing the cap into or out of the handle. The hammer is formed at its outer portion with an axial bore 39, slightly larger in diameter than the inner end of the extension 25, which is slidable therein, and extending longitudinally only part way of the length of the hammer. A transverse slot extends diametrically through the hammer block near the outer end thereof, in which is housed a transversely slidable catch or dog 41. As oriented in Fig. 6, the right end of the dog is rounded, its left end is flat and bears against a leaf spring 42 mounted in a suitable recess in the exterior surface of the hammer, and tending to urge the dog to the right. A transverse bore 43 extends through the dog, of the same diameter as the bore 39 of the hammer and in the same direction but offset to the right therefrom by an amount equal to the depth of the recess 36 in the handle.

To illustrate the device in operation, let it be assumed that it is desired to check the correctness of the relative positions of and spacing between the exit nozzle 50 and the core guide 51 at points 52 and 53, of a cable sheath extrusion press, the points 52 and 53 being in the annular space at that part which governs the thickness of the extruded sheath. In this case as will be seen from Fig. 1, the nearest approach of the guide to the nozzle is in a direction inclined from the perpendicular, and relatively inaccessible by being at the inner end of the nozzle. A small cylindrical slug 60 of plastically deformable material, such as lead for example, is gripped in the chuck 22, 23 and inserted by means of the tool, as shown in Fig. 1, into the tapering approach to the point 52. The handle is then pushed axially along the tool sliding to the left (Fig. 4) over the extension 25 and the hammer 37, and compressing the spring 38. When the shouldered end of the recess 36 arrives under the catch 41, the latter is forced up thereby (Fig. 4, or left in Fig. 6) against the urge of the spring 42 until the bore 43 comes into alinement with the bore 39. The hammer then snaps forward (left in Fig. 4) under the pressure of the spring 38, until the bottom of the bore 39 strikes against the end of the stub 33, delivering a blow thereto which is transmitted along the shaft and chuck to the slug 60, driving the latter into the crevice at the point 52.

Pressure is then released on the handle and the spring 38 drives it back to the right, the spring 29 keeping the shaft in place and partially withdrawing the extension from the bore 39. At a certain point in these simultaneously movements of handle and hammer relative to the extension and to each other, the rounded nose of the catch 41 drops down into the recess 36 and the parts resume the position shown in Fig. 4. Another push on the handle then repeats the above process, and the whole is repeated until the slug 60 has been well swaged into the crevice at 52.

The whole tool is then withdrawn, bringing with it the slug 60 now deformed as suggested by the dotted lines in Fig. 2. The swaged part of the slug may then be measured, e. g., with a micrometer caliper, to find the dimension of the crevice at 52. A similar measurement at 53 will then show whether the guide 51 is equispaced from the nozzle 50 in a vertical direction, and similar tests may be made on other orientations.

The device is particularly useful in connection with extrusion presses for cable sheathing, since the uniformity in thickness of the sheath around the cable depends upon the concentricity of the guide 51 in the nozzle 50. Hitherto this has been in some instances tested by cutting a sample of cable and measuring the actual thickness of the sheath at various points of its cross section, a method which entails the destruction of a portion of the cable. By using the device of the invention to swage say four slugs at points 90° apart (or three slugs 120° apart, etc.) in the crevice between the guide and nozzle a satisfactory check may be obtained without any sacrifice of product.

It is to be noted that in using the device of the invention, the operator is ordinarily positioned behind the handle and can look along the handle to concentrate his attention on reaching and maintaining the precise desired position of the slug. This is because the automatic hammering means in the handle requires no visual attention, whereas if an independent hammer were used the operator's attention would be needed simultaneously at both ends of the tool.

Furthermore the chuck body 21 may have a flat facet 44 formed thereon to receive temporary or permanent identification marks particularly where several measurements are to be made at different points of one element, when a set of chucks may be conveniently prepared with slugs and interchanged at the bayonet joint in use.

Thus measurements possible by means of swaging a deformably plastic slug may be made with this device wherever it is possible to pass the chuck sleeve 23, in situations otherwise substantially inaccessible.

The chuck unit 21, 23 being detachably secured to the rod 20, and the latter being detachably secured to the extension 25, one handle with its hammering mechanism, will suffice for an indefinite variety of interchangeable shafts of differing lengths, any of which may be interchangeably provided with any one of a variety of chucks for different sized slugs.

The nature of the mechanism, housed in the hollow handle of the embodiment disclosed and operative to effect the hammering action, forms no part of the present invention. The particular mechanism herein disclosed is fully disclosed in U. S. Patent 843,655 issued February 12, 1907 upon an application of John A. Adell and Laroy S. Starrett; but any suitable mechanism having an equivalent function and effect may be employed, such for example as that disclosed in Swiss Patent 53,298 of July 17, 1911 to Georg Moos, or that disclosed in French Patent 514,924 of November 19, 1920 to Fabriques des Montres Zenith.

The embodiment of the invention herein disclosed is illustrative only and may be widely modified and departed from without departing from the spirit and scope of the invention as pointed out in and limited only by the appended claims.

What is claimed is:
1. A gauging device comprising a handle, means to secure a plastically deformable slug thereto, a plastically deformable slug in the se- curing means, and means carried by the handle actuable to exert a hammering action on the slug.

2. A gauging device comprising a shaft, means at one end of the shaft to secure a plastically deformable slug thereto, a handle mounted on the other end of the shaft, a plastically deformably slug in the securing means, and means carried by the handle actuable to exert a hammering action through the shaft on the slug.

3. A gauging device comprising a shaft, a chuck at one end thereof to hold a plastically deformable slug, a plastically deformable slug in the securing means, a handle mounted on the shaft, and means carried by the handle actuable to exert a hammering action through the shaft on the slug.

4. A gauging device comprising a handle, a shaft detachably secured to the handle, a chuck detachably secured to one end of the shaft for holding a plastically deformable slug, a plastically deformable slug in the chuck, and means carried by the handle actuable to exert a hammering action through the shaft on the slug.

5. A gauging device comprising a handle, a shaft mounted in the handle, and a plastically deformable slug detachably secured to the end of the shaft.

6. A gauging device comprising a handle, a shaft mounted in the handle, and a plastically deformable slug detachably secured to the end of the shaft in combination with means actuable to exert a hammering action on the slug.

RUDOLPH S. BRESCKA.
EDWARD J. MEAGHER.